E. W. BURGESS.
GRAIN HARVESTER.
APPLICATION FILED OCT. 25, 1915. RENEWED NOV. 22, 1919.
1,345,070.
Patented June 29, 1920.
3 SHEETS—SHEET 2.
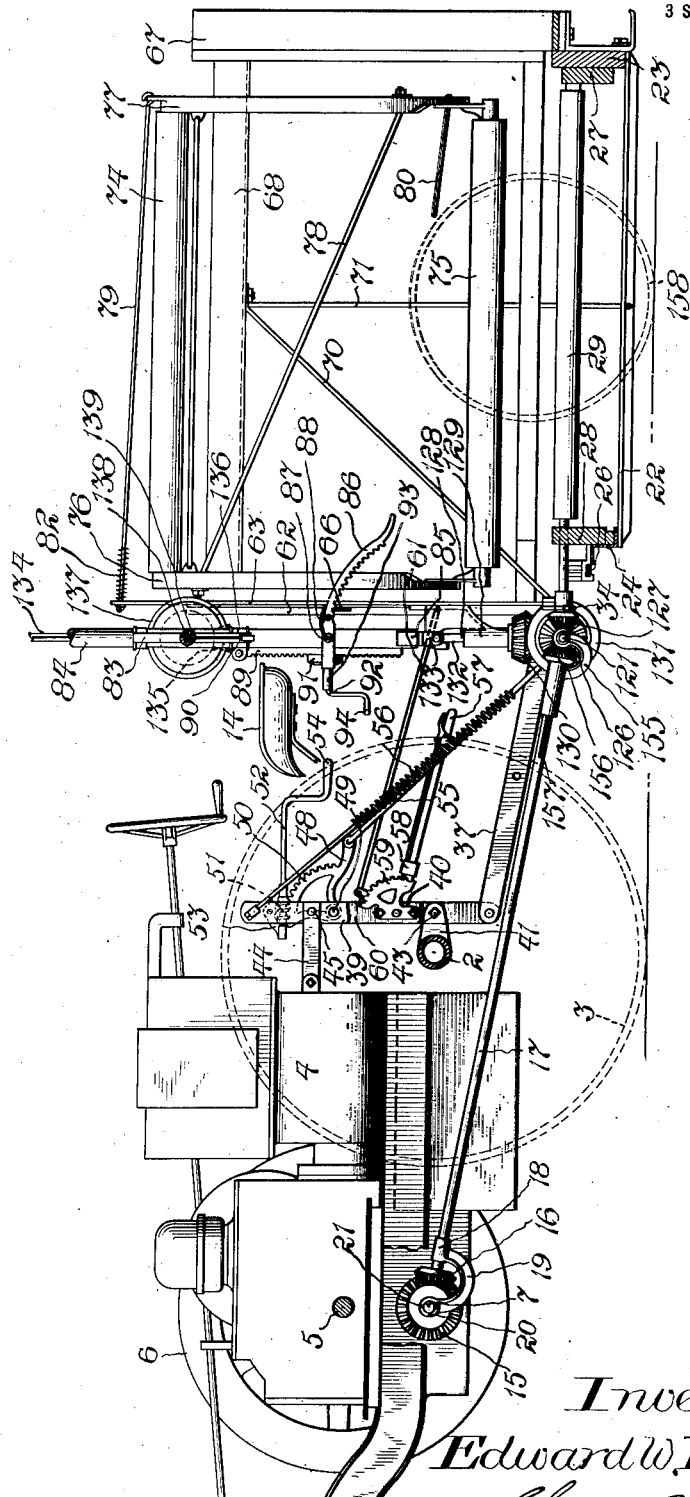

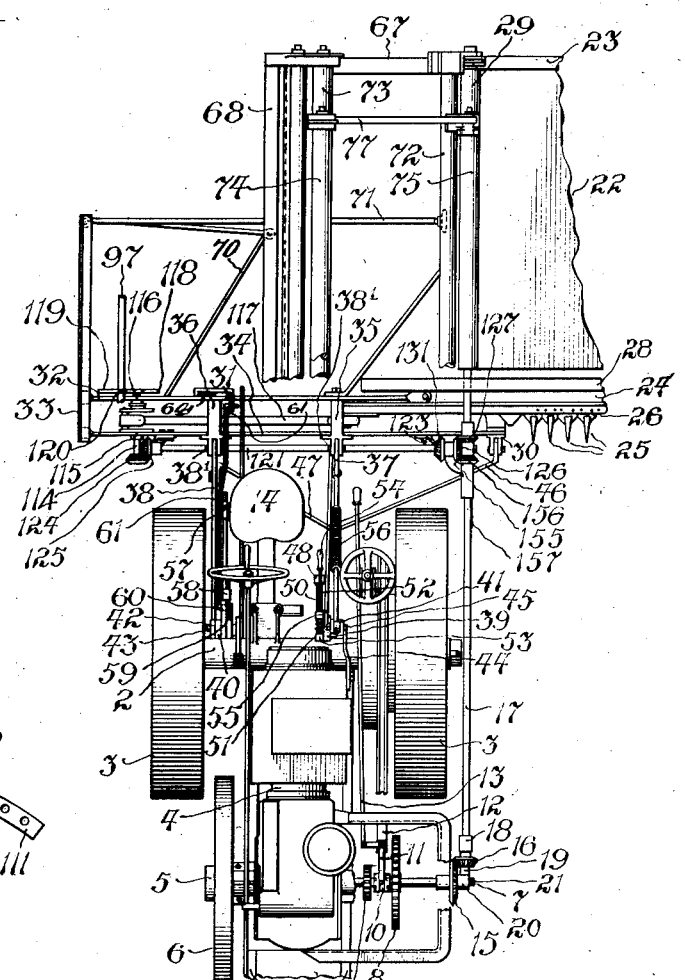

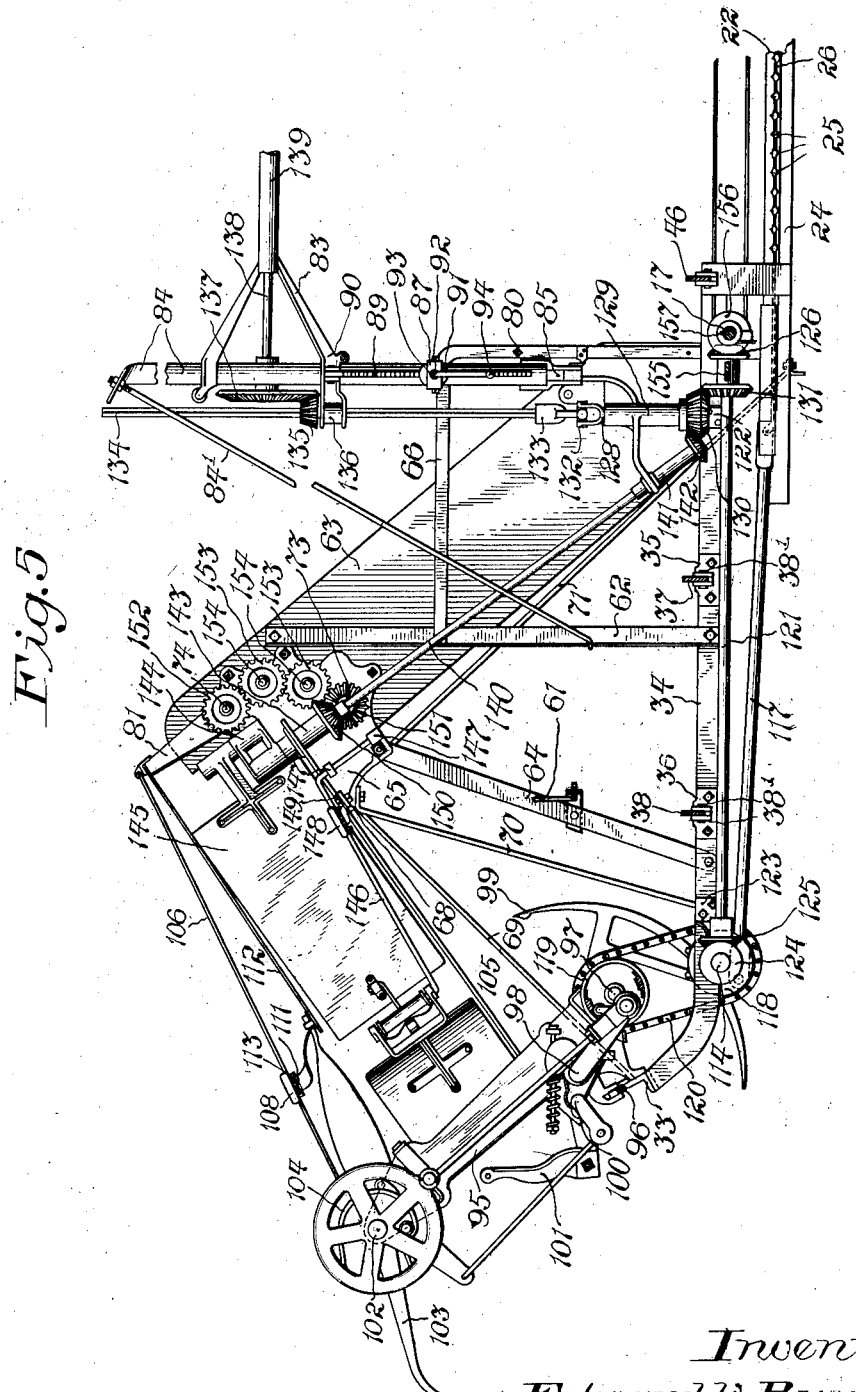

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

GRAIN-HARVESTER.

1,345,070.  Specification of Letters Patent.  Patented June 29, 1920.

Application filed October 25, 1915, Serial No. 57,718. Renewed November 22, 1919. Serial No. 339,964.

*To all whom it may concern:*

Be it known that I, EDWARD W. BURGESS, a citizen of the United States, residing at Chicago, in the county of Cook and State of Illinois, have invented certain new and useful Improvements in Grain-Harvesters, of which the following is a full, clear, and exact specification.

My invention relates to grain harvesters adapted to be carried by the truck frame of a tractor and their operative parts driven by connections with the power transmission gearing of the tractor.

The object of the invention is to eliminate all tractive power elements in the harvester and simplify and lighten its frame structure, to provide means whereby the operator may, from his seat upon the tractor, adjust the harvester in varying operative planes, to adjust the binding attachment in a fore and aft direction, to adjust the reel to varying heights relative to the grain platform and in a fore and aft direction, and to provide means whereby the harvester may be readily coupled with or uncoupled from the tractor.

These objects are attained by means of mechanism, one embodiment of which is illustrated in the accompanying drawings, in which—

Figure 1 is a top plan view of parts of a tractor and harvester coupled together in operative relation and embodying my invention;

Fig. 2 is a detached detail of part of the mechanism for shifting the binding attachment in a fore and aft direction upon the harvester frame;

Fig. 3 is a side elevation of Fig. 2;

Fig. 4 is a side elevation of Fig. 1 on an enlarged scale; and

Fig. 5 is a front elevation of the harvester as shown in Figs. 1 and 4.

Referring to the drawings, wherein the same reference characters designate like parts throughout the several views, the tractor is like in form to that shown and described in my application for patent filed September 22, 1915, Serial No. 52,098, and includes a truck frame 1, having its rear end carried by an axle member 2, having traction wheels 3 mounted thereon, an engine including a cylinder 4, an engine shaft 5, and fly wheel 6. 7 represents an auxiliary countershaft journaled in bearings carried by the truck frame and operatively connected with the power transmission gearing of the tractor by means of gear members 8 and 9 journaled upon the countershaft at the right and left-hand, respectively, of a sliding clutch member 10 mounted upon the shaft and adapted to selectively engage the gear members or be retained in a neutral position, and controlled by means of a clutch shipping bell crank lever 11 pivotally mounted upon a fixed part 12 of the truck frame, and 13 represents a hand controlled member having its front end connected with one arm of the bell crank lever and its opposite end extended within convenient reach of an operator in the seat 14. Secured to the free end of the countershaft 7 is a pinion 15 meshing with a pinion 16 secured to the free end of a longitudinally disposed shaft 17 journaled in a bearing member 18 provided with a forwardly extending curved arm 19 having a sleeve member 20 at its front end that receives the end of the shaft 7, and 21 represents a pin through the shaft and securing the associated parts in operative relation.

The harvester includes a grain platform 22, having a rear sill member 23, a cutter bar 24 at its front side having guards 25 secured thereto, and 26 represents the reciprocatory knife. 27 and 28 represent the apron guides secured to the cutter bar 24 and rear sill member 23, respectively, and 29 the apron driving roller journaled upon the stubble ward end of the guides. 30 represents an inner shoe member secured to the stubbleward end of the cutter bar, 31 a base frame member having one end secured to the stubbleward end of the cutter bar 24 and its opposite upturned end 32 to a binder supporting rail 33, and 34 represents a supplemental base frame member spaced apart from and disposed in front of and parallel with the frame member 31, having one end secured to the shoe member 30 and its opposite upturned end to the rail 33. 35 and 36 represent draft members spaced apart and secured to the frame members 31 and 34 near their grainward and stubbleward ends, respectively, to which are pivotally connected the rear ends of the draft frame members 37 and 38, respectively, by means of pins 38¹, the front ends of the members 37 and 38 being pivotally connected with the lower ends of vertically disposed bars 39 and 40, respectively, that are coupled with ear members 41 and 42, fixedly secured to axle member 2 and forming part of the truck frame of the tractor, by means of coupling pins 43, the upper ends of the bars 39 and 40 being detachably connected with a fixed part of the tractor frame by means of links 44 and pins 45. 46 represents a diagonally disposed supplemental draft member having its rear end secured to the shoe member 30, and its opposite end to the draft member 37, and 47 represents a diagonally disposed draft frame member having one end secured to the member 37 at its junction with the member 46, and its opposite end with the rear end of the draft frame member 38.

Means for adjusting the harvester to a higher or lower plane include a lever 48 pivotally mounted upon a stud 49 secured to the vertically disposed frame member 39, and including a toothed sector 50 engaging with a worm 51 secured to the front end of a shaft 52 journaled in a bracket member 53 secured to the member 39 and provided with a crank 54 at its rear end within convenient reach of an operator, the free end of the lever 48 being connected with the rear end of the draft member 37 by means of a link 55, and 56 represents a counterbalancing spring mechanism connecting the rear end of the member 37 with the upper end of the vertical bar 39.

Means for tilting the harvester in varying operative angles relative to the supporting draft frame include a hand lever 57 pivotally mounted upon the bar 40 and provided with a common form of sliding detent mechanism 58 that operatively engages with a toothed sector 59 secured to the bar 40 in a manner to retain the hand lever in any desired position of adjustment, an arm 60 integral with the hand lever being connected with the frame member 64 of the harvester by means of a link 61 disposed substantially parallel with the draft frame whereby the harvester may be raised or lowered without materially affecting its operative angle.

The frame of the harvester, at its front side, includes a vertical member 62, having its lower end secured to the base frame member 34 and its upper end to an inclined sheet 63 forming the front of the elevator. An inclined brace member 64 has its lower end secured to the member 34 and its upper end to a gear carrying member 65 secured in turn to the upper end of the sheet 63. An L-shaped frame member 66 has one end secured to the middle part of the vertical member 62 and extending grainward parallel with the base frame members 31 and 34 and is turned down and secured to the member 34.

At the rear of the harvester, 67 represents an inclined elevator frame member having its lower end secured to the rear sill member 23 of the grain platform and its upper end to a binder deck supporting rail 68, having its front end secured to the gear carrying member 65 and its middle connected with the binder supporting rail 33, the base frame member 31 and the stubbleward end of the grain platform by means of brace members 69, 70 and 71, respectively. 72 represents the lower roller of the lower elevator carrier, and 73 the upper roller, having their rear ends journaled in the elevator frame member 67 and their front ends in bearings carried by the elevator frame sheet 63 and the gear carrying members 65.

The upper elevator carrier mechanism includes upper and lower rollers 74 and 75, respectively, journaled in a carrying frame comprising an inclined frame member 76 secured to the front sheet 63 and a rear member 77 connected by means of a diagonally disposed brace member 78, and 79 and 80 represent upper and lower tension links having their rear ends connected with the frame member 77 and their front ends slidably connected with an upwardly extending part 81 of the gear carrying member 65 and the frame member 66, respectively, and carrying pressure springs 82 (only one of which is shown) whereby the frame is yieldingly supported in an overhanging position and permitted to rise and fall to a limited extent at its rear end upon the stream of grain being conveyed by the elevator carriers.

The reel may be one of the common forms, and includes a bracket member 83 slidably mounted upon a vertically disposed tubular mast 84, having its lower end pivotally connected with a gear carrying bracket 85 secured to the front of the harvester frame in a manner permitting the reel to swing in a fore and aft direction, a brace member 84[1] connecting the upper end of the mast with the harvester coaxially with its pivot. A toothed bar 86, having its front end pivotally connected with a bracket member 87, is secured to the mast and adapted to engage with the upper edge of the L-shaped frame member 66 in a manner to retain the reel in any desired position of adjustment and within the range of its movement in a fore and aft direction, the bar being yieldingly held in engagement with the frame member by means of a spring 88. Means for adjusting the reel vertically upon the mast include a toothed rack bar 89, having its upper end secured to the lower arm 90 of the bracket member 83, and 91 represents a scroll gear member operatively engaging with the teeth of the rack bar and secured to a shaft 92 journaled in a bearing 93 forming part of the bracket member 87 and provided with a crank portion 94 at its front end within convenient reach of the operator whereby he may adjust the reel in varying planes of its operation.

The binder attachment as shown in Fig. 5 includes a main frame 95 carrying rollers 96, one only being shown, whereby it is supported upon the rail 33 in a manner permitting adjustment thereof in a fore and aft direction, the packer shaft 97, needle shaft 98, needle 99, compressor shaft 100, trip compressing arm 101, knotter shaft 102, discharge arm 103, and cam gear 104, and 105 represents the inclined binder deck having its lower end connected with the frame of the binder and its upper end slidably mounted upon the deck supporting rail 68. 106 represents a radius rod having its upper end pivotally connected with an upwardly extending part 81 of the gear carrying member 65, and its other stubbleward end with the binder frame whereby the binder attachment as a unit may be shifted fore and aft upon the rail 33 and be supported against a lateral movement by the rod 106.

Means are provided for adjusting the binder in a fore and aft direction including a hand piece 108 pivotally mounted upon the rod 106 and provided with a forwardly extending downwardly curved detent member 109, which may be selectively received by openings 110 in a bar 111 secured to the cover sheet 112 and formed concentric with the axis of the radius rod 106, a coiled spring 113 encircling the rod and operative to normally hold the detent in engagement with the bar 111. To adjust the binder attachment the operator grasps the hand piece 108 and releases it from the bar 111, and then he may draw or push the binder in either direction as desired.

114 represents a crank shaft journaled in bearings 115 and 116 carried by the stubbleward ends of the frame bars 34 and 31, respectively, and 117 is a pitman connecting the crank with the knife 26. 118 represents a sprocket wheel secured to the rear end of the crank shaft 114, 119 a sprocket wheel slidably mounted upon the packer shaft 97 and connected therewith by means of a spline, and 120 represents a sprocket chain operatively connecting the two sprocket wheels. 121 represents a transversely disposed shaft having its grainward and stubbleward ends journaled in bearings 122 and 123, respectively, secured to the base frame member 34, 124 a bevel pinion secured to the front of the crank shaft 114 and meshing with a corresponding pinion 125 secured to the adjacent end of the transverse shaft 121, and 126 a bevel pinion secured to the grainward end of the transverse shaft and meshing with a corresponding pinion 127 secured to the front end of the platform carrying roller 29. The reel is operatively connected with the transverse shaft 121 by means including a vertically disposed shaft 128 journaled in a bearing sleeve 129 forming a part of the gear carrying bracket 85 and having a bevel pinion 130 secured to its lower end that meshes with a pinion 131 secured to the transverse shaft 121, and 132 represents a universal coupling member secured to the upper end of the shaft that is operatively connected with a corresponding coupling member 133 secured to the lower end of a vertically disposed shaft 134 that is slidable through a spline carrying pinion 135 journaled in a bearing member 136 and forming a part of the bracket member 83 and meshing with a gear wheel 137 secured to the reel driving shaft 138 journaled in a bearing member 139 carried by the bracket. The driving pinion 135 slides upon the shaft 134 as the reel is raised or lowered, and the universal coupling members 132 and 133 permit the shaft to swing with the mast without affecting its operation. 140 represents a diagonally disposed shaft having its free end journaled in a bearing member 141 carried by the bracket 85, and 142 represents a pinion secured to the shaft and meshing with the pinion 130. The opposite end of the shaft 140 is journaled in a bearing 143 forming a part of the gear carrying member 65, and secured thereto is a crank member 144 that is operatively connected with a butts adjuster 145 movable substantially parallel with the binder deck in a common way and having its stubbleward end supported by means of a swinging link 146 turning in eye members 147 on the gear carrying member 65, and 148 represents a hand piece having the same form as the member 108 pivotally mounted upon the link 146 and adapted to engage with openings in a bar 149 carried by the member 65 whereby the butts adjuster may be swung in a fore and aft direction. Secured to the upper end of the shaft 140 is a bevel pinion 150 meshing with a combined bevel and spur pinion 151 secured to the front end of the journal of the carrier roller 73. 152 represents a spur pinion secured to the front end of the journal of the carrier roller 74, and 153 intermediate pinions journaled upon studs 154 secured to the gear carrying member 65, and transmits motion from the lower carrier roller 73 to the upper carrier roller 74 in a common way. 155 represents an arm having its rear end journaled preferably upon the hub of the pinion 126, and its front end provided with a bearing, in which is journaled the hub of a pinion 156 meshing with the pinion 126. The pinion 156 carries a spline that is received by a keyway 157 in the rear end of the longitudinally disposed shaft 17 in a manner permitting the harvester to be raised or lowered relative to the tractor or tilted about its axis with the draft frame without affecting the operation of the power transmitting mechanism. The grainward end of the grain platform may be supported by a grain wheel 158 in the usual way, as shown by dotted lines in Fig. 4. The stubbleward end of the harvester is supported by the truck frame of the tractor. When the harvester is uncoupled from the tractor its stubbleward end may be temporarily supported by means of blocking, and to connect it with the tractor the tractor is backed to its proper position in front of the harvester and the bars 39 and 40 connected with the ears 41 and 42 by means of the coupling pins 43 and links 44 and other parts of the tractor frame, the platform adjuster and tilting mechanism being manipulated if necessary to bring the parts in proper register. The shaft 17 is then connected with the countershaft 7 of the power transmission gearing of the tractor, and when the tractor is moved forward motion is transmitted to the operative parts of the machine and controlled by the operator by means of the hand operated member 13.

By carrying substantially all of the weight of the harvester upon the truck frame of the tractor, and that of the operator, and transmitting motion to the operative parts of the harvester from the power transmission gearing of the tractor, I eliminate the traction wheel, the wheel frame, the tractive power elements, the operator's seat support, the long levers necessary for adjusting the reel, binding attachment and butts adjuster, and for tilting the harvester, the tongue, whiffletrees, neckyoke, and tongue truck now used with team drawn harvesters, and by locating the main driving shaft at the front of the harvester frame I am enabled to materially reduce the weight of the harvester frame and the grain platform.

Having shown and described one embodiment of my invention, I do not wish that it be confined to the specific details of the structure as illustrated, it being understood that changes may be made in the form, proportion and organization of its various parts without departing from the spirit of my invention.

What I claim as my invention, and desire to secure by Letters Patent, is:

1. A tractor operated harvester having, in combination, a tractor including a truck frame, a harvester, link connections between said truck frame and harvester disposed substantially parallel with each other, means including one of said link connections for varying the angle of tilt of said harvester, and means coöperating with said link connections for raising and lowering said harvester in various positions of angular adjustment without materially affecting the angle of tilt of said harvester.

2. A tractor operated harvester having, in combination, a tractor including a frame, a harvester, link connections between said frame and harvester disposed substantially parallel with each other, means operable from the tractor and including one of said link connections for varying the angle of tilt of said harvester, and means coöperating with said link connection for raising and lowering the harvester in various positions of angular adjustment without materially affecting the angle of tilt.

3. In a harvester, cutting apparatus, a vertically disposed frame extending stubbleward from said cutting apparatus, a rail carried by and disposed in a fore and aft direction at the stubbleward end of said vertical frame, a binder attachment movable in a fore and aft direction upon said rail, a radius bar connecting said binder attachment with the upper part of said vertical frame, and means for adjusting said attachment in a fore and aft direction including a hand piece pivotally mounted upon said radius bar, and having a detent member adapted to engage with a fixed part of the frame structure.

4. A tractor operated harvester having, in combination, a tractor including a truck frame, a harvester including a tiltable and vertically adjustable platform and a vertically adjustable reel, means operable from said truck frame for tilting said platform and for vertically adjusting the same without materially affecting the angle of tilt, and means operable from said truck frame for vertically adjusting said reel.

5. A tractor operated harvester including, in combination, a tractor including a truck frame, a harvester including a grain platform, a vertically disposed frame structure at the front side and stubbleward end of said grain platform, a draft frame having its opposite ends pivotally connected with said vertical frame and said truck frame in a manner permitting a rising and falling movement of its rear end and securing it against a lateral movement, and means connecting said draft frame and said vertically disposed frame with said truck frame and operative to tilt said grain platform in varying angles and to raise or lower the rear end of said frame.

6. A tractor operated harvester including, in combination, a tractor including a truck frame, a harvester including a grain platform, a vertically disposed frame structure at the front side and stubbleward end of said grain platform, a draft frame having its opposite ends pivotally connected with said vertical frame and said truck frame in a manner permitting a rising and falling movement of its rear end and securing it against a lateral movement, and means connecting said draft frame with said vertically disposed frame, operative to raise or lower said harvester without materially affecting the angle of tilt of said grain platform.

7. A tractor operated harvester including, in combination, a tractor including a truck frame, a harvester including a grain platform, a vertically disposed frame structure at the front side and stubbleward end of said grain platform, a draft frame having its opposite ends pivotally connected with said vertical frame and said truck frame in a manner permitting a rising and falling movement of its rear end and securing it against a lateral movement, a pivoted lifting lever carried by said truck frame and having a link connection with the rear end of said draft frame, a tilting lever carried by said truck frame and having a link connection with said vertically disposed frame, said link connections being so disposed with relation to each other that the operative tilt of said grain platform is not materially affected by an operative movement of said lifting lever.

8. A tractor operated harvester including, in combination, a tractor including a truck frame, an axle, traction wheels mounted upon said axle, an engine and power transmission gearing including a longitudinally disposed shaft, a harvester including a grain platform, a vertically disposed frame extending stubbleward from the front side of the grain platform, a draft frame having its rear end pivotally connected with said vertical frame and its front end pivotally connected with said truck frame, and a transverse shaft journaled upon said vertical frame and operatively connected with the moving parts of the harvester, said transverse shaft being driven by said longitudinally disposed shaft.

9. A tractor operated harvester including, in combination, a tractor including a truck frame, an axle, traction wheels mounted upon said axle, an engine and power transmission gearing including a longitudinally disposed shaft, a harvester including a grain platform, a cutting apparatus disposed at the front side of said grain platform, a vertically disposed frame extending stubbleward from said cutting apparatus, a draft frame connecting said vertical frame with said truck frame, a crank shaft journaled upon the stubbleward end of said vertical frame, a pitman connection between said crank shaft and said cutting apparatus, a carrier roller journaled upon the stubbleward end of said grain platform, a transverse shaft journaled upon said vertically disposed frame and having its opposite ends operatively connected with said crank shaft and said carrier roller, and driving connections between said longitudinally disposed shaft and said transverse shaft.

10. A tractor operated harvester including, in combination, a tractor including a truck frame, an axle, traction wheels mounted upon said axle, a seat mounted on said frame, an engine and power transmission gearing including a longitudinally disposed shaft, a harvester including a grain platform, a cutting apparatus disposed at the front side of said grain platform, a vertically disposed frame extending stubbleward from said cutting apparatus, a draft frame connecting said vertical frame with said truck frame, a mast pivotally mounted upon said vertical frame in a manner permitting it to swing in a fore and aft direction, a bracket member slidably mounted upon said mast, a reel journaled in bearings carried by said bracket, a toothed rack bar secured to said bracket, a gear member carried by said mast, means operable from the seat on said truck frame for actuating said gear member to raise and lower said bracket and reel, a transverse shaft journaled upon said vertical frame and operatively connected to said reel, and driving connections between said transverse shaft and said longitudinally disposed shaft.

11. A tractor operated harvester including, in combination, a tractor including a truck frame, a seat mounted on said truck frame, an axle, traction wheels mounted upon said axle, an engine and power transmission gearing including a longitudinally disposed shaft, a harvester including a grain platform, a cutting apparatus at the front side of said grain platform, a vertically disposed frame extending stubbleward from said cutting apparatus, a draft frame connecting said vertical frame with said truck frame, a mast pivotally mounted upon said vertical frame in a manner permitting it to swing in a fore and aft direction, a bracket slidably mounted upon said mast, a reel journaled upon said bracket, means for adjusting said bracket upon said mast, said means including a yoke secured to said mast, a toothed bar having its upper end connected with said bracket and its body portion slidably received by said yoke, a scroll gear journaled upon said yoke and engaging with said toothed bar, and means located in proximity to and operable from the seat of the tractor for actuating the scroll gear to raise or lower said bracket and reel.

12. A tractor operated harvester including, in combination, a tractor including a truck frame, an axle, traction wheels mounted upon said axle, an engine and power transmission gearing including a longitudinally disposed shaft, a harvester including a grain platform, a cutting apparatus at the front side of said grain platform, a vertically disposed frame extending stubbleward from said cutting apparatus, a draft frame connecting said vertical frame with said truck frame, a mast pivotally mounted upon said vertical frame in a manner permitting it to swing in a fore and aft direction, a bracket slidably mounted upon said mast, a reel journaled upon said bracket, means for adjusting said bracket upon said mast, said means including a yoke secured to said mast, a toothed bar having its upper end connected with said bracket and its body portion slidably received by said yoke, a scroll gear journaled upon said yoke and engaging with said toothed bar, means operable from the frame of said tractor for actuating said scroll gear to raise or lower said bracket and reel, and means for securing said mast in a fore and aft adjustment, said means including a bar having its front end pivotally connected with said yoke and its body portion provided with a series of notches adapted to selectively engage with said vertical frame.

13. A tractor operated harvester including, in combination, a tractor including a truck frame, an axle, traction wheels mounted upon said axle, an engine and power transmission gearing including a longitudinally disposed shaft, a harvester including a grain platform, a cutting apparatus at the front side of said grain platform, a vertically disposed frame extending stubbleward from said cutting apparatus, a draft frame connecting said vertically disposed frame with said truck frame, a rail carried by and disposed in a fore and aft direction at the stubbleward end of said vertical frame, a binder attachment movable in a fore and aft direction upon said rail, a radius bar connecting said binder attachment with the upper part of said vertical frame, means for adjusting said attachment in a fore and aft direction including a hand piece pivotally mounted upon said radius bar and having a detent member adapted to engage with a fixed part of the frame structure.

In testimony whereof I affix my signature.

EDWARD W. BURGESS.